United States Patent
Yuan et al.

(10) Patent No.: US 10,754,662 B2
(45) Date of Patent: Aug. 25, 2020

(54) SYSTEM AND METHOD FOR DISTRIBUTED SYSTEM DISCOVERY IN A CLUSTERED ENVIRONMENT

(71) Applicant: EMC IP Holding Company, LLC, Hopkinton, MA (US)

(72) Inventors: Yongquan Yuan, Shanghai (CN); Yong Wang, Shanghai (CN); Zhenzan Zhou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 16/038,587

(22) Filed: Jul. 18, 2018

(65) Prior Publication Data

US 2019/0026119 A1  Jan. 24, 2019

(30) Foreign Application Priority Data

Jul. 21, 2017 (CN) .......................... 2017 1 0599911

(51) Int. Cl.
*H04L 29/08* (2006.01)
*G06F 9/4401* (2018.01)
*H04L 12/24* (2006.01)

(52) U.S. Cl.
CPC .......... *G06F 9/4416* (2013.01); *G06F 9/4405* (2013.01); *G06F 9/4408* (2013.01); *H04L 41/0893* (2013.01); *H04L 67/1097* (2013.01); *H04L 67/34* (2013.01)

(58) Field of Classification Search
CPC combination set(s) only.
See application file for complete search history.

(56) References Cited

U.S. PATENT DOCUMENTS

| | | | |
|---|---|---|---|
| 2006/0047906 A1* | 3/2006 | Umemura | G06F 3/0605 711/114 |
| 2009/0150718 A1* | 6/2009 | Park | G06F 11/2025 714/4.1 |
| 2014/0250214 A1* | 9/2014 | Onishi | G06F 3/0605 709/220 |
| 2015/0169875 A1* | 6/2015 | Ide | G06F 21/44 713/2 |
| 2016/0140003 A1* | 5/2016 | Panara | G06F 11/2017 714/6.21 |
| 2018/0074724 A1* | 3/2018 | Tremblay | G06F 3/0611 |

* cited by examiner

*Primary Examiner* — Raymond N Phan
(74) *Attorney, Agent, or Firm* — Brian J. Colandreo; Mark H. Whittenberger; Holland & Knight LLP (57) ABSTRACT

A method, computer program product, and computing system for initiating a boot mode process for a plurality of devices included within a device cluster of a storage system. The boot mode process includes: generating a cluster device identifier for a first device chosen from the plurality of devices, generating a cluster device count for the first device, and broadcasting from the first device to all of the other plurality of devices, a boot cluster device message. The boot cluster device message includes the cluster device identifier of the first device, and the cluster device count of the first device. The boot cluster device message is broadcast at a first frequency.

21 Claims, 4 Drawing Sheets

SYSTEM AND METHOD FOR DISTRIBUTED SYSTEM DISCOVERY IN A CLUSTERED ENVIRONMENT

RELATED APPLICATION

The subject application claims the priority of China Patent Application No. 201710599911.4, filed on 21 Jul. 2017, the contents of which are herein incorporated by reference in its entirety.

TECHNICAL FIELD

This disclosure relates to discovery systems and methods and, more particularly, to discovery systems and methods for use within data storage systems.

BACKGROUND

Storing and safeguarding electronic content is of paramount importance in modern business. Accordingly, various methodologies may be employed to protect such electronic content. One such methodology is to utilize high availability systems to reduce the likelihood of data loss.

As would be expected, such high availability systems are often quite complex and involve multiple components and subcomponents, all of which need to discovered by one another in order to operate properly.

SUMMARY OF DISCLOSURE

In one implementation, a computer-implemented method is executed on a computing device and includes initiating a boot mode process for a plurality of devices included within a device cluster of a storage system. The boot mode process includes: generating a cluster device identifier for a first device chosen from the plurality of devices, generating a cluster device count for the first device, and broadcasting from the first device to all of the other plurality of devices, a boot cluster device message. The boot cluster device message includes the cluster device identifier of the first device, and the cluster device count of the first device. The boot cluster device message is broadcast at a first frequency.

One or more of the following features may be included. The boot mode process may further include: receiving boot cluster device messages from one or more of the other plurality of devices, incrementing the cluster device count of the first device based, at least in part, upon the boot cluster device messages received from one or more of the other plurality of devices, and rebroadcasting the boot cluster device message from the first device to all of the other plurality of devices. A fast mode process may be initiated after a defined period of time. The fast mode process may include broadcasting, from the first device to all of the other plurality of devices, a fast cluster device message. The fast cluster device message may include: the cluster device identifier of the first device, and the cluster device count of the first device. The fast cluster device message may be broadcast at a second frequency that is less than the first frequency. The fast mode process may further include: receiving cluster device messages from one or more of the other plurality of devices, incrementing the cluster device count of the first device based, at least in part, upon the fast cluster device messages received from one or more of the other plurality of devices, and rebroadcasting the fast cluster device message from the first device to all of the other plurality of devices. A stable mode process may be initiated once all of the devices within the device cluster have been identified. The stable mode process may include broadcasting, from the first device to all of the other plurality of devices, a stable cluster device message. The stable cluster device message that may include: the cluster device identifier of the first device, and the cluster device count of the first device. The stable cluster device message may be broadcast at a third frequency that is less than the second frequency. The stable mode process may further includes: receiving stable cluster device messages from one or more of the other plurality of devices, and determining if the cluster device count of the first device is the same as the cluster device count included within the cluster device messages received from one or more of the other plurality of devices. The stable mode process may further include, if the cluster device count of the first device is not the same as the cluster device count included within the cluster device messages received from one or more of the other plurality of devices, the fast mode process may be reinitiated.

In another implementation, a computer program product resides on a computer readable medium and has a plurality of instructions stored on it. When executed by a processor, the instructions cause the processor to perform operations including initiating a boot mode process for a plurality of devices included within a device cluster of a storage system. The boot mode process includes: generating a cluster device identifier for a first device chosen from the plurality of devices, generating a cluster device count for the first device, and broadcasting from the first device to all of the other plurality of devices, a boot cluster device message. The boot cluster device message includes the cluster device identifier of the first device, and the cluster device count of the first device. The boot cluster device message is broadcast at a first frequency.

One or more of the following features may be included. The boot mode process may further include: receiving boot cluster device messages from one or more of the other plurality of devices, incrementing the cluster device count of the first device based, at least in part, upon the boot cluster device messages received from one or more of the other plurality of devices, and rebroadcasting the boot cluster device message from the first device to all of the other plurality of devices. A fast mode process may be initiated after a defined period of time. The fast mode process may include broadcasting, from the first device to all of the other plurality of devices, a fast cluster device message. The fast cluster device message may include: the cluster device identifier of the first device, and the cluster device count of the first device. The fast cluster device message may be broadcast at a second frequency that is less than the first frequency. The fast mode process may further include: receiving cluster device messages from one or more of the other plurality of devices, incrementing the cluster device count of the first device based, at least in part, upon the fast cluster device messages received from one or more of the other plurality of devices, and rebroadcasting the fast cluster device message from the first device to all of the other plurality of devices. A stable mode process may be initiated once all of the devices within the device cluster have been identified. The stable mode process may include broadcasting, from the first device to all of the other plurality of devices, a stable cluster device message. The stable cluster device message that may include: the cluster device identifier of the first device, and the cluster device count of the first device. The stable cluster device message may be broadcast at a third frequency that is less than the second frequency. The stable mode process may further includes: receiving stable cluster device messages from one or more of the other plurality of devices, and determining if the cluster device count of the first device is the same as the cluster device count included within the cluster device messages received from one or more of the other plurality of devices. The stable mode process may further include, if the cluster device count of the first device is not the same as the cluster device count included within the cluster device messages received from one or more of the other plurality of devices, the fast mode process may be reinitiated.

In another implementation, a computing system includes a processor and memory is configured to perform operations including initiating a boot mode process for a plurality of devices included within a device cluster of a storage system. The boot mode process includes: generating a cluster device identifier for a first device chosen from the plurality of devices, generating a cluster device count for the first device, and broadcasting from the first device to all of the other plurality of devices, a boot cluster device message. The boot cluster device message includes the cluster device identifier of the first device, and the cluster device count of the first device. The boot cluster device message is broadcast at a first frequency.

One or more of the following features may be included. The boot mode process may further include: receiving boot cluster device messages from one or more of the other plurality of devices, incrementing the cluster device count of the first device based, at least in part, upon the boot cluster device messages received from one or more of the other plurality of devices, and rebroadcasting the boot cluster device message from the first device to all of the other plurality of devices. A fast mode process may be initiated after a defined period of time. The fast mode process may include broadcasting, from the first device to all of the other plurality of devices, a fast cluster device message. The fast cluster device message may include: the cluster device identifier of the first device, and the cluster device count of the first device. The fast cluster device message may be broadcast at a second frequency that is less than the first frequency. The fast mode process may further include: receiving cluster device messages from one or more of the other plurality of devices, incrementing the cluster device count of the first device based, at least in part, upon the fast cluster device messages received from one or more of the other plurality of devices, and rebroadcasting the fast cluster device message from the first device to all of the other plurality of devices. A stable mode process may be initiated once all of the devices within the device cluster have been identified. The stable mode process may include broadcasting, from the first device to all of the other plurality of devices, a stable cluster device message. The stable cluster device message that may include: the cluster device identifier of the first device, and the cluster device count of the first device. The stable cluster device message may be broadcast at a third frequency that is less than the second frequency. The stable mode process may further includes: receiving stable cluster device messages from one or more of the other plurality of devices, and determining if the cluster device count of the first device is the same as the cluster device count included within the cluster device messages received from one or more of the other plurality of devices. The stable mode process may further include, if the cluster device count of the first device is not the same as the cluster device count included within the cluster device messages received from one or more of the other plurality of devices, the fast mode process may be reinitiated.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
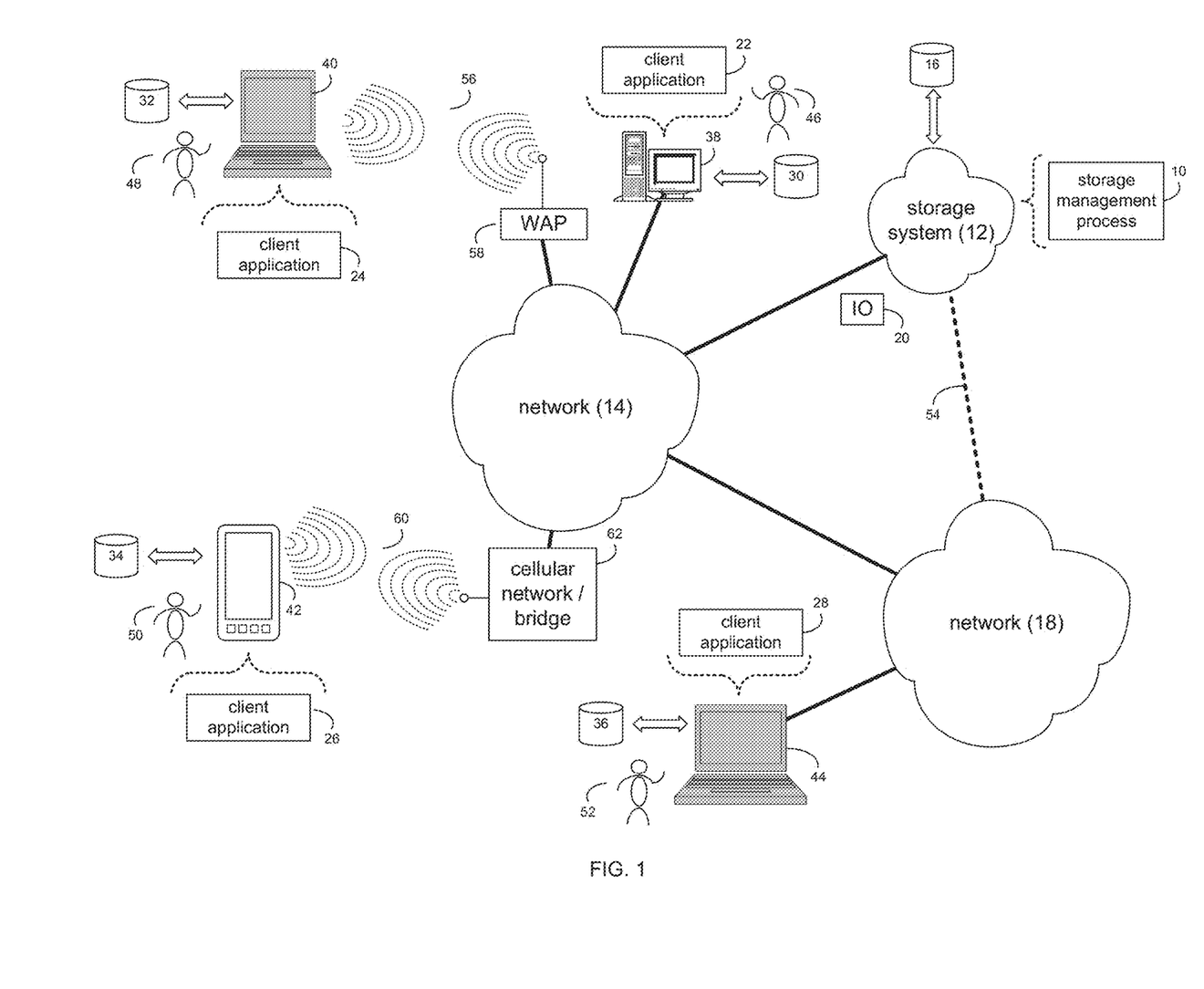
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives;

tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
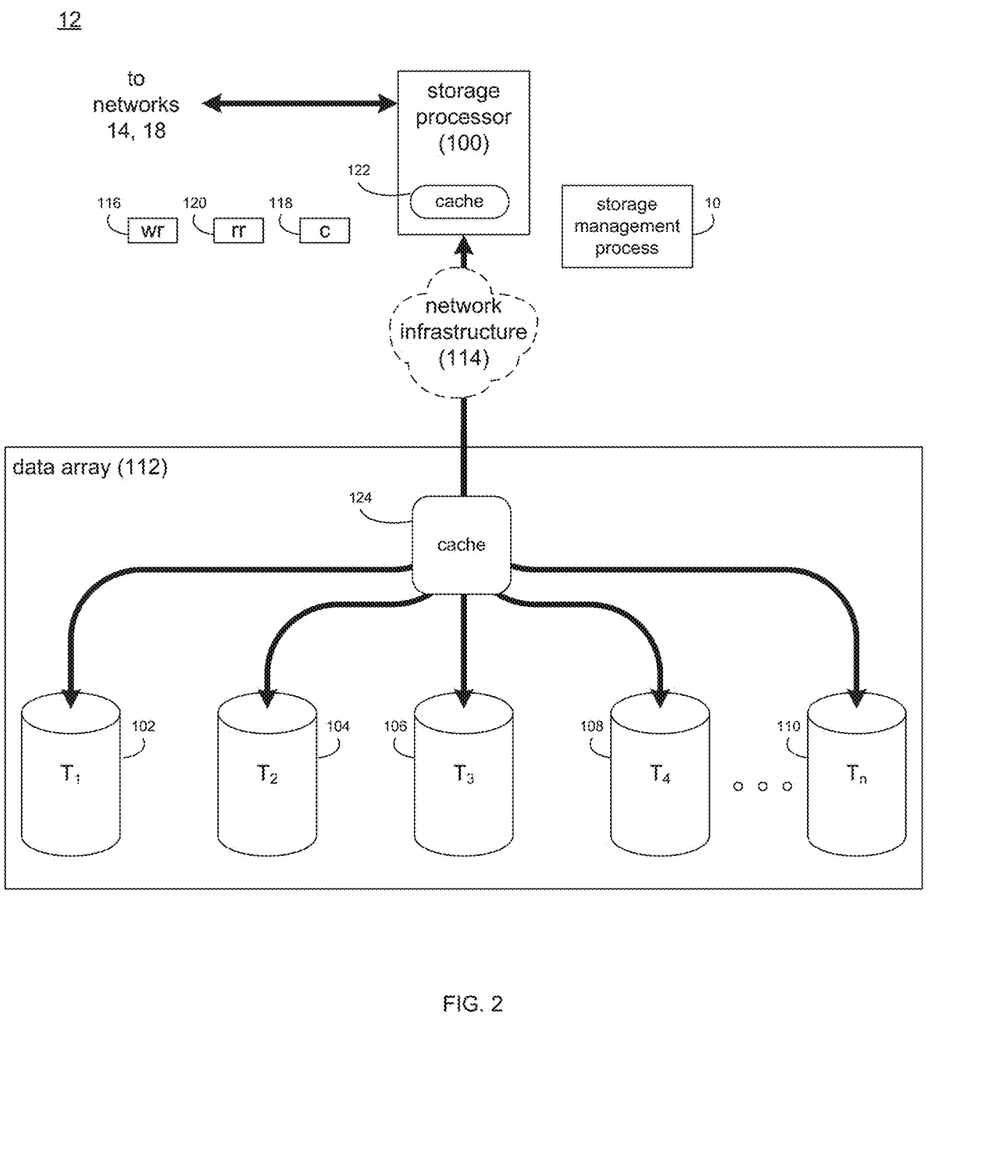
FIG. 2 is a diagrammatic view of another implementation of the storage system of FIG. 1.

Referring also to FIG. 2, there is shown one particular implementation of storage system 12. Storage system 12 may include storage processor 100 and a plurality of storage targets $T_{1-n}$ (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

As discussed above, storage system 12 may include various devices, systems and subsystems (e.g., storage processor 100, network infrastructure 114 and/or data array 112). Further, the implementation of storage system 12 shown in FIG. 2 is generally a simplified implementation, as other embodiments of storage system 12 may be considerably more complex and may include considerable more devices, systems and subsystems. For example, typical/other embodiments of storage system 12 may include multiple storage processors and multiple data arrays. Additionally, other devices, systems and subsystems may be included within storage system 12, examples of which may include but are not limited to: server systems; caching systems; disk systems and battery backup systems.

As discussed above, all devices within storage system 12 may be coupled via a network infrastructure (e.g., network infrastructure 114) and may be configured to operate within a cluster. Unfortunately and when storage system 12 is started (or restarted), each of these devices, systems and subsystems needs to be booted and all of the devices, systems and subsystems within storage system 12 need to be identified.

Automated Device Discovery:

Accordingly and as will be discussed below in greater detail, storage management process 10 may be configured to allow each of the devices, systems and subsystems within a cluster to be identified to each other.

Figure 3:
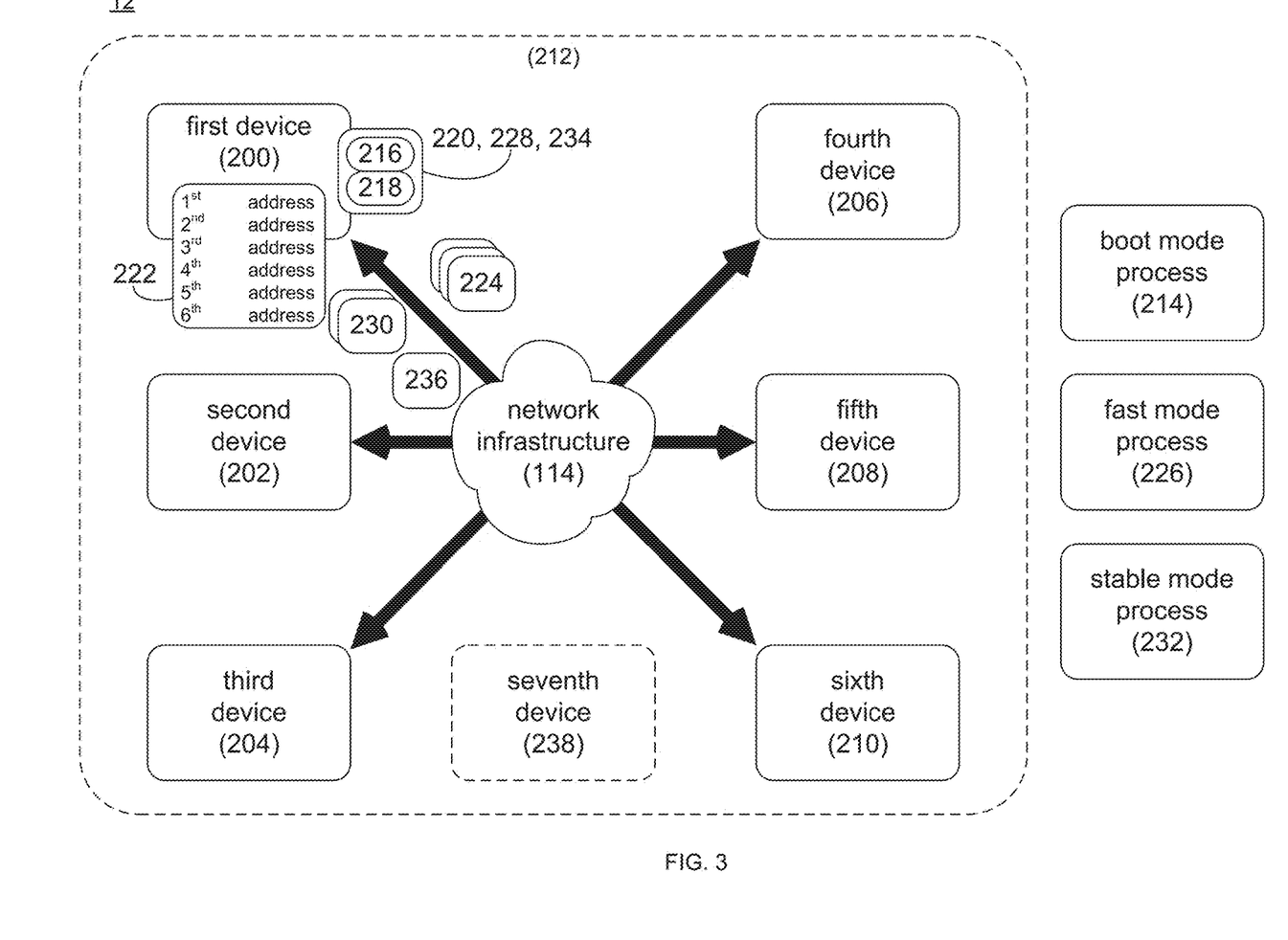
FIG. 3 is a diagrammatic view of another implementation of the storage system of FIG. 1.

Referring also to FIG. 3, there is shown an illustrative implementation of storage system 12, wherein storage system 12 is shown to include six of the above-described devices, systems and subsystems, namely: first device 200, second device 202, third device 204, fourth device 206, fifth device 208 and sixth device 210, all of which are coupled together via network infrastructure 114.

First device 200, second device 202, third device 204, fourth device 206, fifth device 208, sixth device 210 and network infrastructure 114 may be configured to form device cluster 212 for storage system 12. As is known in the art, a device cluster (e.g., device cluster 212) may include a set of loosely or tightly connected computers (e.g., first device 200, second device 202, third device 204, fourth device 206, fifth device 208 and sixth device 210) that may be configured to work together so that (in many respects) they may be viewed as a single system. The components of a cluster (e.g., device cluster 212) may be connected to each other through fast local area networks (e.g., network infrastructure 114). Clusters (e.g., device cluster 212) may be deployed to provide a higher level of performance and/or availability (while typically being more cost-effective than a single device having comparable performance/availability).

Unfortunately and as discussed above, when storage system 12 is started (or restarted), each of these devices, systems and subsystems needs to be booted and all of the devices, systems and subsystems (e.g., first device 200, second device 202, third device 204, fourth device 206, fifth device 208 and sixth device 210) within device cluster 212 will need to be identified.

Figure 4:
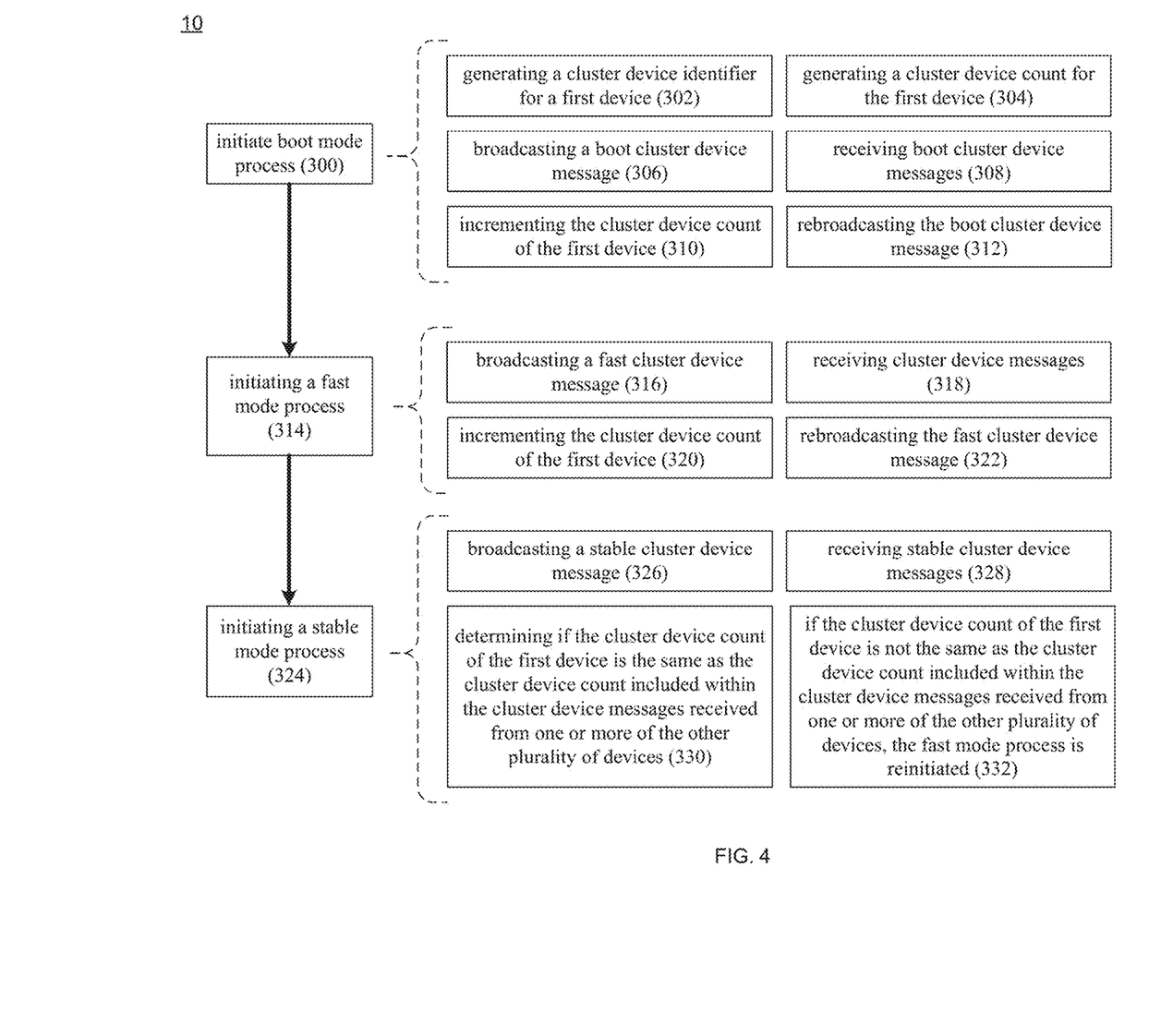
FIG. 4 is a flow chart of the storage management process of FIG. 1.

Accordingly and referring also to FIG. 4, when storage system 12 is started (or restarted), storage management process 10 may initiate 300 boot mode process 214 for the plurality of devices (e.g., first device 200, second device 202, third device 204, fourth device 206, fifth device 208 and sixth device 210) included within device cluster 212 of storage system 12. While the following discussion concerns first device 200, it is understood that the operation of boot mode process 214 may be simultaneously performed on each of the plurality of devices (e.g., first device 200, second device 202, third device 204, fourth device 206, fifth device 208 and sixth device 210) included within device cluster 212 of storage system 12.

The instruction sets and subroutines of boot mode process 214 may be a portion of storage management process 10, may be stored on storage device 16 included within storage system 12, and may be executed by one or more processors (not shown) and one or more memory architectures (not shown) included within storage system 12.

Boot mode process 214 may generate 302 cluster device identifier 216 for a first device (e.g., first device 200) chosen from the plurality of devices (e.g., first device 200, second device 202, third device 204, fourth device 206, fifth device 208 and sixth device 210) and may generate 304 cluster device count 218 for first device 200. Boot mode process 214 may then broadcast 306 from first device 200 to all of the other plurality of devices (e.g., second device 202, third device 204, fourth device 206, fifth device 208 and sixth device 210) boot cluster device message 220, wherein boot cluster device message 220 may include cluster device identifier 216 of first device 200 and cluster device count 218 of first device 200.

Cluster device identifier 216 may be any identifier that allows for the unique identification of (in this example) first device 200. Examples of such a unique identifier may include but are not limited to a MAC (i.e., Media Access Control) address or a UUID (i.e., a Universally Unique Identifier). Cluster device count 218 may include a numeric count that defines the number of unique devices (included within cluster 212) that were known to (in the example) first device 200 at the time that cluster device count 218 was generated. For example, assume that when boot mode process 214 is initiated 300 and cluster device count 218 is generated 304, boot mode process 214 does not yet know about the existence of (in this example) any of the other plurality of devices (e.g., second device 202, third device 204, fourth device 206, fifth device 208 and sixth device 210). Accordingly and for boot cluster device message 220 initially broadcast 306, boot cluster device message 220 may include a cluster device count 218 of "1" (as first device 200 only knows about itself at this time). Boot cluster device message 220 may be broadcast 306 at a first frequency (e.g., once every 100 milliseconds), wherein this first frequency may be comparatively high to enable the quick and efficient discovery of devices within cluster 212.

Boot mode process 214 may be configured to maintain a device table (e.g., device table 222) that identifies all of the devices identified thus far within cluster 212, wherein a device table may be maintained for each of the plurality of devices (e.g., first device 200, second device 202, third device 204, fourth device 206, fifth device 208 and sixth device 210). Since, as stated above, first device 200 only knows about itself thus far, device table 222 would only include one entry (namely an entry that corresponds to device 200).

Since all of the devices within device cluster 212 are generating and broadcasting boot cluster device messages, boot mode process 214 may receive 308 boot cluster device messages (e., device messages 224) from one or more of the other plurality of devices (e.g., second device 202, third device 204, fourth device 206, fifth device 208 and sixth device 210). Accordingly, assume that first device 200 receives 308 three boot cluster devices messages from three devices (e.g., second device 202, third device 204, fourth device 206) included within device cluster 212.

Accordingly, boot mode process 214 may update device table 222 to include an entry for second device 202, third device 204 and fourth device 206 (in addition to the entry that was already in device table 222 for first device 200). Boot mode process 214 may also increment 310 cluster device count 218 of first device 200 based, at least in part, upon the boot cluster device messages 224 received from one or more of the other plurality of devices (e.g., second device 202, third device 204, fourth device 206). Boot mode process 214 may then rebroadcast 312 boot cluster device message 220 from first device 200 to all of the other plurality of devices (e.g., second device 202, third device 204, fourth device 206, fifth device 208 and sixth device 210). Accordingly, boot cluster device message 220 may include a cluster device count 218 of "4" (as first device 200 now knows about itself, second device 202, third device 204 and fourth device 206).

Storage management process 10 may initiate 314 fast mode process 226 after a defined period of time (e.g., five seconds). While the following discussion concerns first device 200, it is understood that the operation of fast mode process 226 may be simultaneously performed on each of the plurality of devices (e.g., first device 200, second device 202, third device 204, fourth device 206, fifth device 208 and sixth device 210) included within device cluster 212 of storage system 12.

The instruction sets and subroutines of fast mode process 226 may be a portion of storage management process 10, may be stored on storage device 16 included within storage system 12, and may be executed by one or more processors (not shown) and one or more memory architectures (not shown) included within storage system 12.

Fast mode process 226 may function in a fashion similar to boot mode process 214, albeit at a slower place. For example, fast mode process 226 may broadcast 316, from first device 200 to all of the other plurality of devices (e.g., second device 202, third device 204, fourth device 206, fifth device 208 and sixth device 210) fast cluster device message 228 that includes cluster device identifier 216 of first device 200 and cluster device count 218 of first device 200. Fast cluster device message 228 may be broadcast 316 at a second frequency that is less than the first frequency. For example, while boot cluster device message 220 may be broadcast 306 every 100 milliseconds, fast cluster device message 228 may be broadcast 316 every second.

Since all of the devices within device cluster 212 are generating and broadcasting fast cluster device messages, fast mode process 226 may receive 318 fast cluster device messages (e.g., device messages 230) from one or more of the other plurality of devices. Accordingly, assume that first device 200 receives 318 two fast cluster devices messages (e.g., device messages 230) from two devices (e.g., fifth device 208 and sixth device 210) included within device cluster 212.

Accordingly, fast mode process 226 may update device table 222 to include an entry for fifth device 208 and sixth device 210 (in addition to the entries that were already in device table 222 for first device 200, second device 202, third device 204 and fourth device 206). Fast mode process 226 may also increment 320 cluster device count 218 of first device 200 based, at least in part, upon fast cluster device messages 230 received from one or more of the other plurality of devices (e.g., fifth device 208 and sixth device 210). Fast mode process 226 may then rebroadcast 322 fast cluster device message 228 from first device 200 to all of the other plurality of devices (e.g., second device 202, third device 204, fourth device 206, fifth device 208 and sixth device 210). Accordingly, fast cluster device message 228 may include a cluster device count 218 of "6" (as first device 200 now knows about itself, second device 202, third device 204, fourth device 206, fifth device 208 and sixth device 210).

Storage management process 10 may initiate 324 stable mode process 232 after all devices within device cluster 212 know about all of the other devices within device cluster 212. While the following discussion concerns first device 200, it is understood that the operation of fast mode process 226 may be simultaneously performed on each of the plurality of devices (e.g., first device 200, second device 202, third device 204, fourth device 206, fifth device 208 and sixth device 210) included within device cluster 212 of storage system 12.

The instruction sets and subroutines of stable mode process 232 may be a portion of storage management process 10, may be stored on storage device 16 included within storage system 12, and may be executed by one or more processors (not shown) and one or more memory architectures (not shown) included within storage system 12.

Stable mode process 232 may function in a fashion similar to fast mode process 226, albeit at a slower place. For example, stable mode process 232 may broadcast 326 from first device 200 to all of the other plurality of devices (e.g., second device 202, third device 204, fourth device 206, fifth device 208 and sixth device 210) stable cluster device message 234 that includes cluster device identifier 216 of first device 200 and cluster device count 218 of first device

200. Stable cluster device message 234 may be broadcast 326 at a third frequency that is less than the second frequency. For example, while fast cluster device message 228 may be broadcast 316 every second, stable cluster device message 234 may be broadcast 326 every five second.

Since all of the devices within device cluster 212 are generating and broadcasting stable cluster device messages, stable mode process 232 may receive 328 stable cluster device messages (e.g., device messages 236) from one or more of the other plurality of devices included within device cluster 212.

Whenever one of these stable cluster device messages (e.g., device messages 236) is received 328, stable mode process 232 may determine 330 if the cluster device count of first device 200 (in this example) is the same as the cluster device count included within the cluster device messages received 328 from one or more of the other plurality of devices (e.g., second device 202, third device 204, fourth device 206, fifth device 208 and sixth device 210). Assuming that each of the devices within device cluster 212 has been discovered by each of the other devices within device cluster 212, the cluster device count of each device should be "6" and each device table should identify six addresses.

If it is determined 330 that the cluster device count of (in this example) first device 200 is not the same as the cluster device count included within the cluster device messages received from one or more of the other plurality of devices (e.g., second device 202, third device 204, fourth device 206, fifth device 208 and sixth device 210), stable mode process 232 may be reinitiated 332.

For example, if a new device (e.g., seventh device 238) is added to device cluster 212, seventh device 238 may begin broadcasting 326 stable cluster device messages that include a cluster device count 218 of "1" (as seventh device 238 only knows of itself at this time). When these messages are received by the plurality of devices (e.g., first device 200, second device 202, third device 204, fourth device 206, fifth device 208 and sixth device 210), this cluster device count mismatch may result in fast mode process 226 being reinitiated 332 so that seventh device 238 can quickly learn about the other devices included within device cluster 212 (e.g., first device 200, second device 202, third device 204, fourth device 206, fifth device 208 and sixth device 210). Additionally, the other devices included within device cluster 212 (e.g., first device 200, second device 202, third device 204, fourth device 206, fifth device 208 and sixth device 210) may quickly learn about seventh device 238.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    initiating a boot mode process for a plurality of devices included within a device cluster of a storage system, wherein the boot mode process includes:
        generating a cluster device identifier for a first device chosen from the plurality of devices,
        generating a cluster device count for the first device, wherein the cluster device count includes an initial identification of all known devices of the plurality of devices by the first device,
        storing the cluster device count for the first device in a device table,
        broadcasting from the first device to all of the other plurality of devices, a boot cluster device message that includes:
            the cluster device identifier of the first device, and
            the cluster device count of the first device,
            wherein the boot cluster device message is broadcast at a first frequency, and
        maintaining the device table, wherein maintaining the device table includes updating the device table to include all currently known devices of the plurality of devices by the first device.

2. The computer-implemented method of claim 1 wherein the boot mode process further includes:
    receiving boot cluster device messages from one or more of the other plurality of devices,
    incrementing the cluster device count of the first device based, at least in part, upon the boot cluster device messages received from one or more of the other plurality of devices, and
    rebroadcasting the boot cluster device message from the first device to all of the other plurality of devices.

3. The computer-implemented method of claim 1 further comprising:
    initiating a fast mode process after a defined period of time, wherein the fast mode process includes:
        broadcasting, from the first device to all of the other plurality of devices, a fast cluster device message that includes:
            the cluster device identifier of the first device, and
            the cluster device count of the first device,
            wherein the fast cluster device message is broadcast at a second frequency that is less than the first frequency.

4. The computer-implemented method of claim 3 wherein the fast mode process further includes:
    receiving cluster device messages from one or more of the other plurality of devices,
    incrementing the cluster device count of the first device based, at least in part, upon the fast cluster device messages received from one or more of the other plurality of devices, and
    rebroadcasting the fast cluster device message from the first device to all of the other plurality of devices.

5. The computer-implemented method of claim 3 further comprising:
    initiating a stable mode process once all of the devices within the device cluster have been identified, wherein the stable mode process includes:
        broadcasting from the first device to all of the other plurality of devices, a stable cluster device message that includes:
            the cluster device identifier of the first device, and
            the cluster device count of the first device,
            wherein the stable cluster device message is broadcast at a third frequency that is less than the second frequency.

6. The computer-implemented method of claim 5 wherein the stable mode process further includes:
    receiving stable cluster device messages from one or more of the other plurality of devices, and determining if the cluster device count of the first device is the same as the cluster device count included within the cluster device messages received from one or more of the other plurality of devices.

7. The computer-implemented method of claim 6 wherein the stable mode process further includes:
if the cluster device count of the first device is not the same as the cluster device count included within the cluster device messages received from one or more of the other plurality of devices, the fast mode process is reinitiated.

8. A computer program product residing on a computer readable medium having a plurality of instructions stored thereon which, when executed by a processor, cause the processor to perform operations comprising:
initiating a boot mode process for a plurality of devices included within a device cluster of a storage system, wherein the boot mode process includes:
generating a cluster device identifier for a first device chosen from the plurality of devices,
generating a cluster device count for the first device, wherein the cluster device count includes an initial identification of all known devices of the plurality of devices by the first device,
storing the cluster device count for the first device in a device table,
broadcasting from the first device to all of the other plurality of devices, a boot cluster device message that includes:
the cluster device identifier of the first device, and
the cluster device count of the first device,
wherein the boot cluster device message is broadcast at a first frequency, and
maintaining the device table, wherein maintaining the device table includes updating the device table to include all currently known devices of the plurality of devices by the first device.

9. The computer program product of claim 8 wherein the boot mode process further includes:
receiving boot cluster device messages from one or more of the other plurality of devices,
incrementing the cluster device count of the first device based, at least in part, upon the boot cluster device messages received from one or more of the other plurality of devices, and
rebroadcasting the boot cluster device message from the first device to all of the other plurality of devices.

10. The computer program product of claim 8 further comprising:
initiating a fast mode process after a defined period of time, wherein the fast mode process includes:
broadcasting, from the first device to all of the other plurality of devices, a fast cluster device message that includes:
the cluster device identifier of the first device, and
the cluster device count of the first device,
wherein the fast cluster device message is broadcast at a second frequency that is less than the first frequency.

11. The computer program product of claim 10 wherein the fast mode process further includes:
receiving cluster device messages from one or more of the other plurality of devices,
incrementing the cluster device count of the first device based, at least in part, upon the fast cluster device messages received from one or more of the other plurality of devices, and
rebroadcasting the fast cluster device message from the first device to all of the other plurality of devices.

12. The computer program product of claim 10 further comprising:
initiating a stable mode process once all of the devices within the device cluster have been identified, wherein the stable mode process includes:
broadcasting from the first device to all of the other plurality of devices, a stable cluster device message that includes:
the cluster device identifier of the first device, and
the cluster device count of the first device,
wherein the stable cluster device message is broadcast at a third frequency that is less than the second frequency.

13. The computer program product of claim 12 wherein the stable mode process further includes:
receiving stable cluster device messages from one or more of the other plurality of devices, and
determining if the cluster device count of the first device is the same as the cluster device count included within the cluster device messages received from one or more of the other plurality of devices.

14. The computer program product of claim 13 wherein the stable mode process further includes:
if the cluster device count of the first device is not the same as the cluster device count included within the cluster device messages received from one or more of the other plurality of devices, the fast mode process is reinitiated.

15. A computing system including a processor and memory configured to perform operations comprising:
initiating a boot mode process for a plurality of devices included within a device cluster of a storage system, wherein the boot mode process includes:
generating a cluster device identifier for a first device chosen from the plurality of devices,
generating a cluster device count for the first device, wherein the cluster device count includes an initial identification of all known devices of the plurality of devices by the first device,
storing the cluster device count for the first device in a device table,
broadcasting from the first device to all of the other plurality of devices, a boot cluster device message that includes:
the cluster device identifier of the first device, and
the cluster device count of the first device,
wherein the boot cluster device message is broadcast at a first frequency, and
maintaining the device table, wherein maintaining the device table includes updating the device table to include all currently known devices of the plurality of devices by the first device.

16. The computing system of claim 15 wherein the boot mode process further includes:
receiving boot cluster device messages from one or more of the other plurality of devices,
incrementing the cluster device count of the first device based, at least in part, upon the boot cluster device messages received from one or more of the other plurality of devices, and
rebroadcasting the boot cluster device message from the first device to all of the other plurality of devices.

17. The computing system of claim 15 further comprising:
initiating a fast mode process after a defined period of time, wherein the fast mode process includes:

broadcasting, from the first device to all of the other plurality of devices, a fast cluster device message that includes:
the cluster device identifier of the first device, and
the cluster device count of the first device,
wherein the fast cluster device message is broadcast at a second frequency that is less than the first frequency.

18. The computing system of claim 17 wherein the fast mode process further includes:
receiving cluster device messages from one or more of the other plurality of devices,
incrementing the cluster device count of the first device based, at least in part, upon the fast cluster device messages received from one or more of the other plurality of devices, and
rebroadcasting the fast cluster device message from the first device to all of the other plurality of devices.

19. The computing system of claim 17 further comprising:
initiating a stable mode process once all of the devices within the device cluster have been identified, wherein the stable mode process includes:
broadcasting from the first device to all of the other plurality of devices, a stable cluster device message that includes:
the cluster device identifier of the first device, and
the cluster device count of the first device,
wherein the stable cluster device message is broadcast at a third frequency that is less than the second frequency.

20. The computing system of claim 19 wherein the stable mode process further includes:
receiving stable cluster device messages from one or more of the other plurality of devices, and
determining if the cluster device count of the first device is the same as the cluster device count included within the cluster device messages received from one or more of the other plurality of devices.

21. The computing system of claim 20 wherein the stable mode process further includes:
if the cluster device count of the first device is not the same as the cluster device count included within the cluster device messages received from one or more of the other plurality of devices, the fast mode process is reinitiated.

* * * * *